United States Patent
Choi et al.

(10) Patent No.: US 8,403,358 B2
(45) Date of Patent: Mar. 26, 2013

(54) INTERNAL AIRBAG DEVICE

(75) Inventors: Hyeong Ho Choi, Gwangmyeong-si (KR); Jun Yeol Choi, Seoul (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 13/164,597

(22) Filed: Jun. 20, 2011

(65) Prior Publication Data

US 2012/0133114 A1 May 31, 2012

(30) Foreign Application Priority Data

Nov. 29, 2010 (KR) .......................... 10-2010-0119623

(51) Int. Cl.
*B60R 21/213* (2011.01)
(52) U.S. Cl. ................ 280/728.2; 280/743.2; 280/730.1
(58) Field of Classification Search ............... 280/728.2, 280/729, 730.1, 743.1, 743.2
See application file for complete search history.

(56) References Cited

U.S. PATENT DOCUMENTS

| | | | | |
|---|---|---|---|---|
| 2,834,606 A | * | 5/1958 | Bertrand | 280/730.1 |
| 3,774,936 A | * | 11/1973 | Barnett et al. | 280/730.1 |
| 6,123,355 A | * | 9/2000 | Sutherland | 280/728.2 |
| 6,431,586 B1 | * | 8/2002 | Eyrainer et al. | 280/730.1 |
| 6,648,367 B2 | * | 11/2003 | Breed et al. | 280/730.1 |
| 6,722,691 B1 | * | 4/2004 | Håland et al. | 280/730.1 |
| 6,932,380 B2 | * | 8/2005 | Choi | 280/730.1 |
| 7,152,873 B2 | * | 12/2006 | Peng et al. | 280/730.1 |
| 7,195,276 B2 | * | 3/2007 | Higuchi | 280/730.1 |
| 2002/0024200 A1 | * | 2/2002 | Eckert et al. | 280/730.1 |
| 2010/0133797 A1 | * | 6/2010 | Kim et al. | 280/743.2 |

FOREIGN PATENT DOCUMENTS

JP 2008-284904 A 11/2008

* cited by examiner

*Primary Examiner* — Joseph Rocca
*Assistant Examiner* — Robert A Coker
(74) *Attorney, Agent, or Firm* — Morgan, Lewis & Bockius LLP

(57) ABSTRACT

An internal airbag device may include an inflator, an airbag housing mounted in a roof in a region between a front seat and a rear seat, and an airbag received in the airbag housing to deploy downwards by gas supplied from the inflator, wherein the airbag includes a horizontal airbag section supported by the roof during the gas may be supplied therein in a deployment thereof, and a vertical airbag section fluid-connected to the horizontal airbag section and extending downwards from an end of the horizontal airbag section opposite the rear seat in a deployment thereof.

5 Claims, 6 Drawing Sheets

INTERNAL AIRBAG DEVICE

CROSS-REFERENCE TO RELATED APPLICATIONS

The present application claims priority to Korean Patent Application No. 10-2010-0119623 filed on Nov. 29, 2010, the entire contents of which is incorporated herein for purposes by this reference.

BACKGROUND OF THE INVENTION

1. Field of the Invention

The present invention relates, in general, to an internal airbag device which is mounted in an interior of a vehicle and, more particularly, to an internal air bag device in which an airbag deploys in a vehicle collision between a front seat and a rear seat to prevent a secondary collision of a rear seat occupant with a front seat occupant and with the front seat or frontal objects.

2. Description of Related Art

Generally, vehicles are equipped with a variety of safety devices for protecting a driver and passengers from sudden accidents. Representative safety devices are airbag devices that directly protect a driver and a front seat occupant.

Such airbag devices are internal airbag devices that inflate in the interior of a vehicle to protect a driver and a front seat passenger. The airbag devices, however, collectively protect front seat occupants among all passengers. This is because of a belief that during a vehicle collision, front seat occupants have a great risk of being damaged due to striking a steering wheel or an instrument panel, whereas rear seat occupants who are further away from a collision point than the front seat occupant are relatively safe.

However, rear seat occupants who do not wear a seatbelt may be damaged during a frontal collision of a vehicle by striking the front seat occupants or front seats. Considering that the seatbelt wearing rate of rear seat occupants is considerably lower than front seat occupants, there is a need to further develop internal airbag devices for rear seat occupants.

Then, as shown in FIG. 5, an internal airbag device has been proposed that protects rear seat occupants. However, such an internal airbag device operates such that an airbag 13, received in an airbag housing 12 mounted in a front seat 11, inflates towards the rear seat occupant's face, causing the rear seat occupant 2 to feel discomfort. Further, the direction and position of deployment of the airbag vary according to a forward or rearward motion or a reclining angle of a front seat, which is problematic. Thus, the function of adjusting the forward or rearward motion or the reclining angle of the front seat needs to be restricted. However, this is not preferred because the comfort of an occupant sitting in the front seat is also greatly restricted.

Furthermore, conventional airbags which deploy in the vehicle interior during a vehicle collision separately inflate in the side of the front seat and rear seat, respectively, so that they cannot completely protect rear seat occupants from impacts.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to propose an internal airbag device in which an airbag deploys in a vehicle collision between a front seat and a rear seat to prevent a secondary collision of a rear seat occupant with a front seat occupant and with the front seat or frontal objects.

In an aspect of the present invention, the internal airbag device may include an inflator, an airbag housing mounted in a roof in a region between a front seat and a rear seat, and an airbag received in the airbag housing to deploy downwards by gas supplied from the inflator, wherein the airbag may include a horizontal airbag section supported by the roof during the gas may be supplied therein in a deployment thereof, and a vertical airbag section fluid-connected to the horizontal airbag section and extending downwards from an end of the horizontal airbag section opposite the rear seat in a deployment thereof.

The vertical airbag section may be a substantially planar airbag member involving spacing between a driver's seat and a front passenger seat.

The vertical airbag section and the roof may be connected by at least a tether in order to reinforce the strength of the deploying airbag.

At least a tether may be connected between the horizontal airbag section and the vertical airbag section.

At least a vent hole may be provided at a boundary region formed between the horizontal airbag section and the vertical airbag section.

The vertical airbag section may have a plurality of division airbag sections spaced apart at regular intervals and extending a distance directly downwards from a horizontal chamber of the horizontal airbag section to form the vertical airbag section, wherein the horizontal chamber may be fluid-connected with the inflator.

At least a tether of a certain length may be connected between a lower ends of the plurality of division airbag sections and the horizontal airbag section in order to allow the division airbag sections to be bent into upper-side airbag sections and lower-side airbag sections when being deployed.

A lower end portion of the vertical airbag section may be bent in a predetermined direction.

The inflator may be a dual-stage inflator.

In another aspect of the present invention, the internal airbag device may include an inflator, an airbag housing mounted in a roof in a region between a front seat and a rear seat, and an airbag received in the airbag housing to deploy downwards by gas supplied from the inflator, wherein the airbag may include a horizontal chamber fluid-connected to the inflator, a first airbag section having a pair of first elbow-type airbag sections to be disposed in association with a driver's seat upon full inflation, the first elbow-type airbag sections being fluid-connected with the horizontal chamber, and a second airbag section having a pair of second elbow-type airbag sections to be disposed in association with a front passenger seat upon full inflation, the second elbow-type airbag sections being fluid-connected with the horizontal chamber.

The first and second elbow-type airbag sections may be provided with vertical plates for respectively connecting the corresponding airbag section while maintaining the respective airbag section bent into an elbow shape The first and second elbow-type airbag sections may be provided with a horizontal plate for integrally connecting neighboring airbag sections with each other.

According to the present invention as configured as above, during a vehicle collision, the airbag deploys in front of a rear seat occupant between a front seat and a rear seat even when the front seat may be folded forwards, so that the rear seat occupant may be prevented from striking the front seat occupant and the front seat or frontal objects, thereby effectively absorbing impacts applied to the rear seat occupant.

The methods and apparatuses of the present invention have other features and advantages which will be apparent from or are set forth in more detail in the accompanying drawings, which are incorporated herein, and the following Detailed Description of the Invention, which together serve to explain certain principles of the present invention.

BRIEF DESCRIPTION OF THE DRAWINGS

FIG. 3A through 3B are views illustrating various exemplary embodiments of an internal airbag device deploying, wherein FIG. 3A is a plan view, and FIG. 3B is a side view.

FIGS. 4A through 4D are views illustrating various exemplary embodiments of an internal airbag device deploying, wherein FIG. 4A is a plan view, FIG. 4B is a side view, FIG. 4C is a front view, and FIG. 4D is a partial perspective view.

Figure 1:
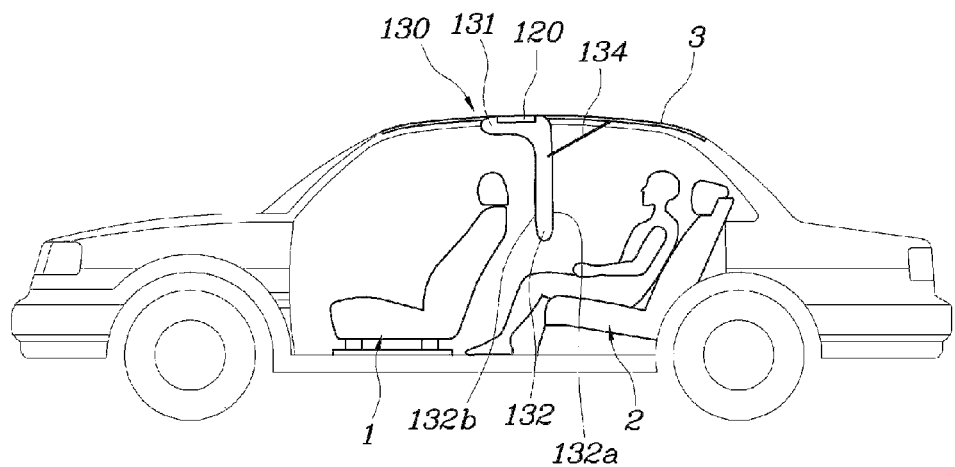
FIG. 1 is a view illustrating various exemplary embodiments of an internal airbag device deploying.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION OF THE INVENTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Figure 2:
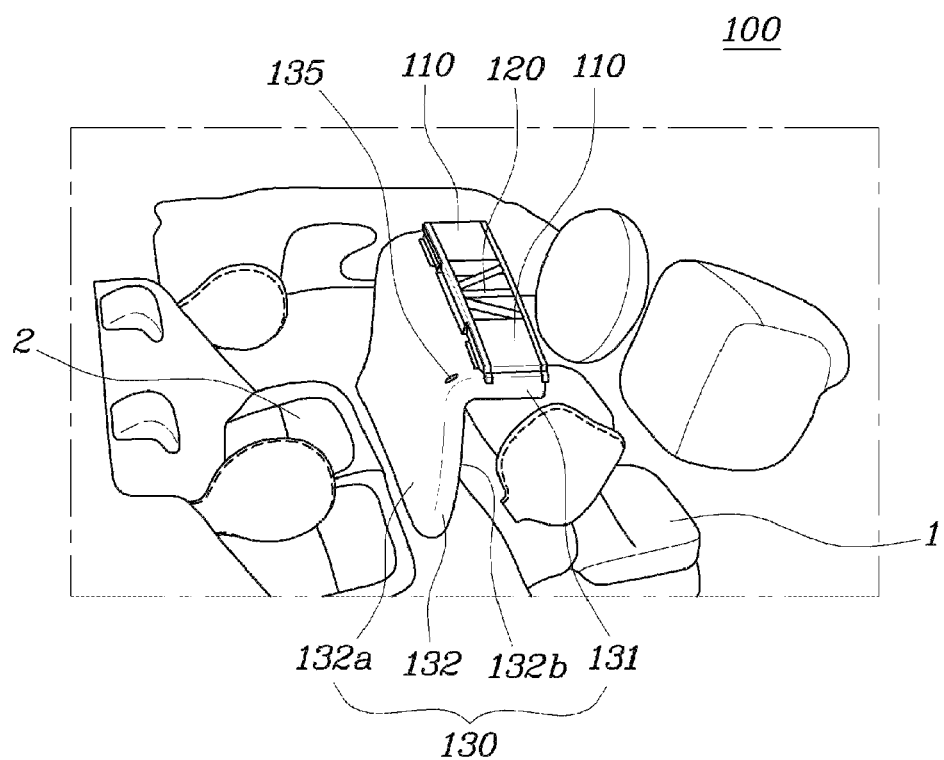
FIG. 2 is a perspective view illustrating various exemplary embodiments of an internal airbag device deploying.

A first embodiment of an internal airbag device 100, as shown in FIGS. 1 and 2, includes an inflator 110, an airbag housing 120, and an airbag 130 in order to deploy between a front seat and a rear seat to protect rear seat occupants in a safe manner.

The airbag housing 120 is mounted in a roof 3 in a region between the front seat 1 and the rear seat 2. The airbag 130 becomes inflated with gas supplied from the inflator 110 and expands out of the airbag housing 120 to deploy downwards between the front seat and the rear seat to thereby protect the rear seat occupants safely from impacts.

The inflator 110 may be mounted in a space between an outer roof panel constituting the roof 3 and an inner headliner. Preferably, the inflator is a dual-stage inflator that inflates gas in two stages, wherein a first inflation is carried out within about 30 ms, and a second inflation is carried out when the rear seat occupant 2 collides with the airbag 130 (at this time, a pressure of the airbag starts to reduce), so that a horizontal upper face of the airbag 130 becomes closely supported by the headliner of the roof 3 owing to an increased pressure thereof.

The airbag housing 120 also mounted in a space between the roof panel of the roof 3 and the headliner. The bottom of the airbag housing 120 may be covered by the headliner, or otherwise may be exposed to an outer compartment of the headliner. In the former case, the headliner may be provided with a tether line for deployment of the airbag, and in the latter case, an airbag door may be provided in the bottom of the airbag housing.

The airbag 130 has a closed space in which gas pressure is maintained upon the supply of airbag gas. Then, the airbag 130 includes a horizontal airbag section 131 which becomes closely supported by the roof 3 upon deployment of airbag gas, and a vertical airbag section 132 which extends a distance directly downwards from an end of the horizontal airbag section 131 opposite the rear seat 2.

The vertical airbag section 132 is a portion with which a face or a chest of an occupant sitting in the rear seat 2 directly collides. The vertical airbag section 132, as shown in FIGS. 1 and 2, may consist of a substantially planar airbag member that involves spacing between a driver's seat and a front passenger seat.

Thus, upon full inflation, the vertical airbag section 132 expands between the front seat and rear seat, throughout the driver's seat and the front passenger seat, including the spacing therebetween, so that the rear seat occupant is essentially prevented from striking the front seat, or from advancing towards and colliding with an instrument panel or other frontal vehicle parts through the spacing between the driver's seat and the front passenger seat.

Further, the vertical airbag section 132 of the airbag 130 can fully deploy downwards to divide the vehicle interior into two spaces even when the back of the front seat is folded forward, thereby safely absorbing impacts applied to the rear seat occupant during a vehicle collision.

The vertical airbag section 132 may preferably have a length that upon full deployment extends to knee portion of the rear seat occupant, and a lower end of the vertical airbag section 132 may preferably be bent towards the rear seat occupant at a certain angle.

Further, while a front side 132a of the vertical airbag section which faces the rear seat 2, and a rear side 132b of the vertical airbag section which faces the front seat 1 may be substantially linear, the sides are not limited thereto, but may be curved.

Preferably, left and right tethers 134 in a pair may be provided between the vertical airbag section 132 and the roof 3 to connect them with each other in order to reinforce the strength of the deploying airbag in a forward or rearward direction.

In another exemplary embodiment of the present invention, at least a tether may be connected between the horizontal airbag section 131 and the vertical airbag section 132.

Further, at least one vent hole 135 may be provided at a boundary region between the horizontal airbag section 131 and the vertical airbag section 132 in order to allow the airbag gas filled in the airbag to escape from the airbag. The vent hole 135 may be configured so that in the normal state, it is closed, but above a certain pressure level, it is open. Then, when the rear seat occupant collides with the vertical airbag section 132, the gas pressure of the airbag 130 is reduced by escaping through the vent hole, thereby absorbing impacts applied to the rear seat occupant.

Figure 3A:
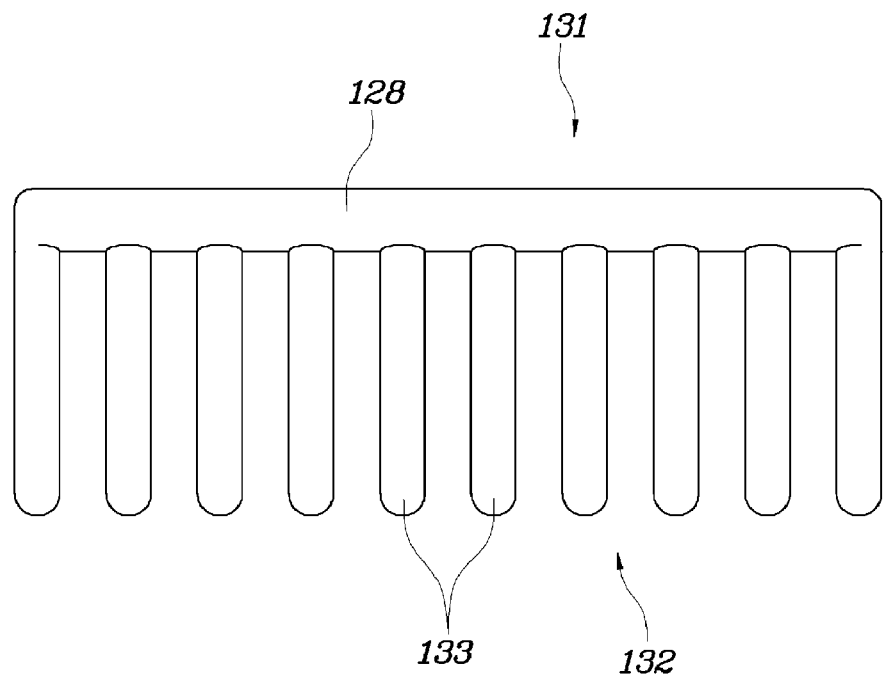
Figure 3B:
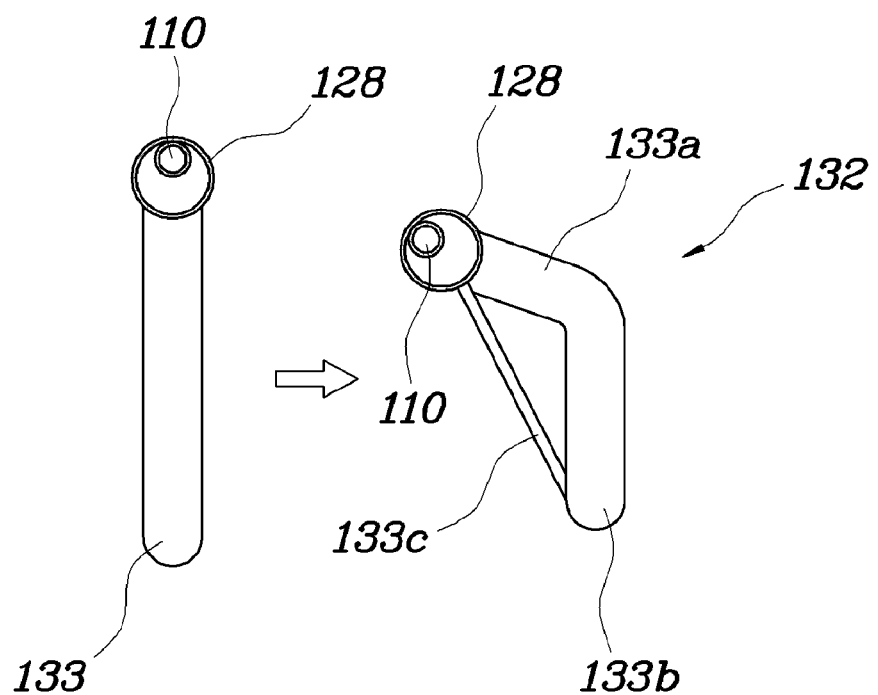
Figure 4A:
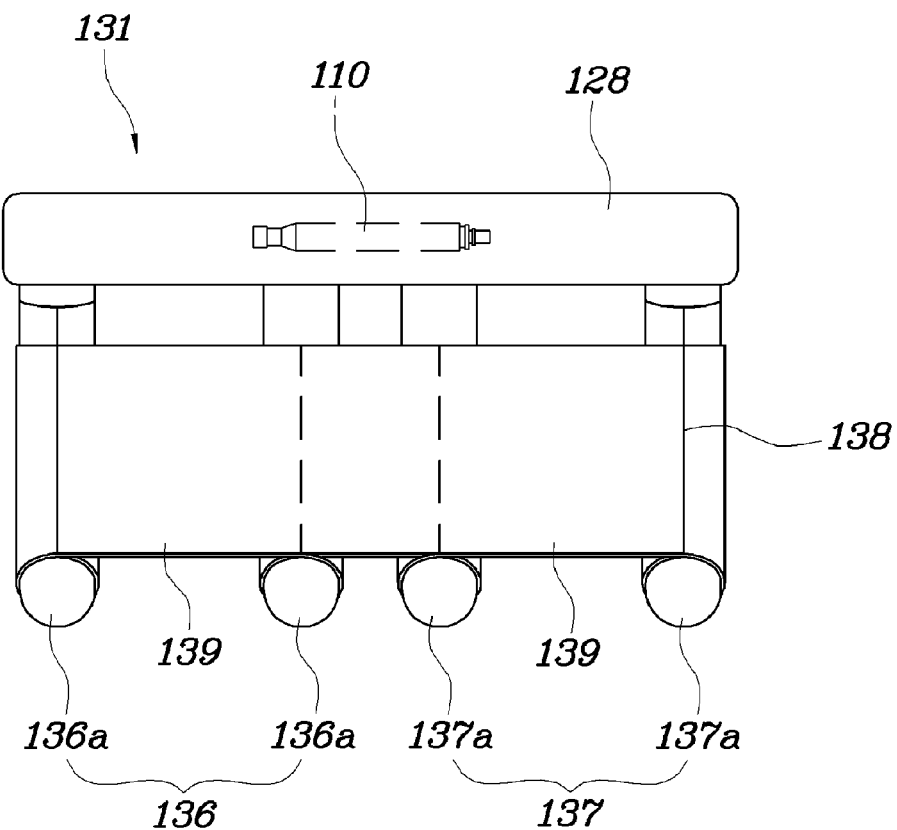
Figure 4B:
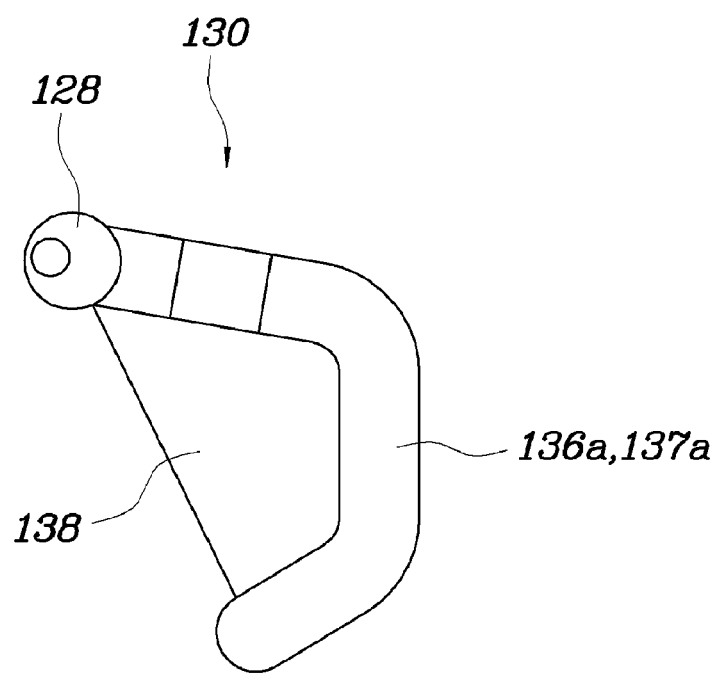
Figure 4C:
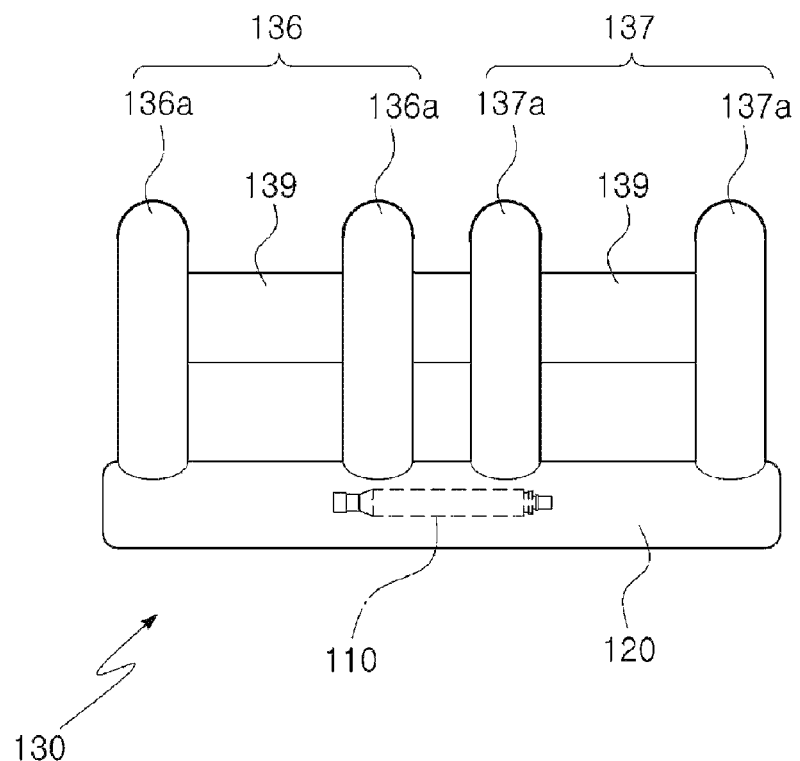
Figure 4D:
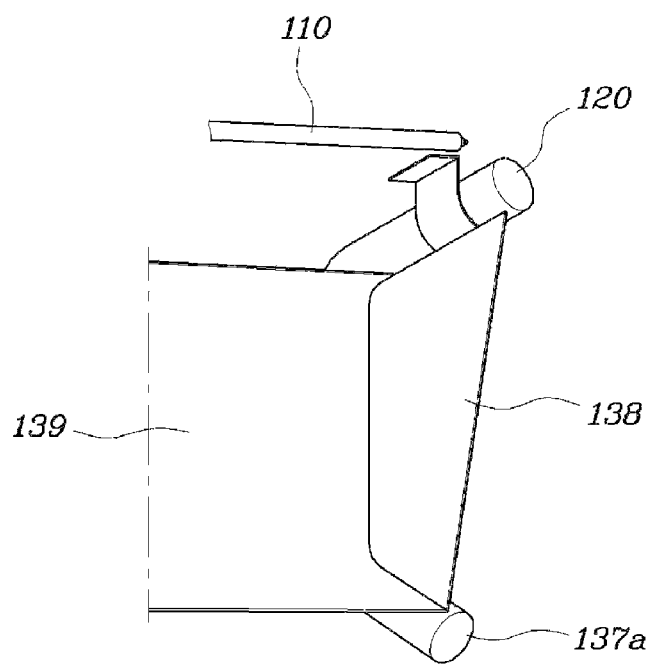
Figure 5:
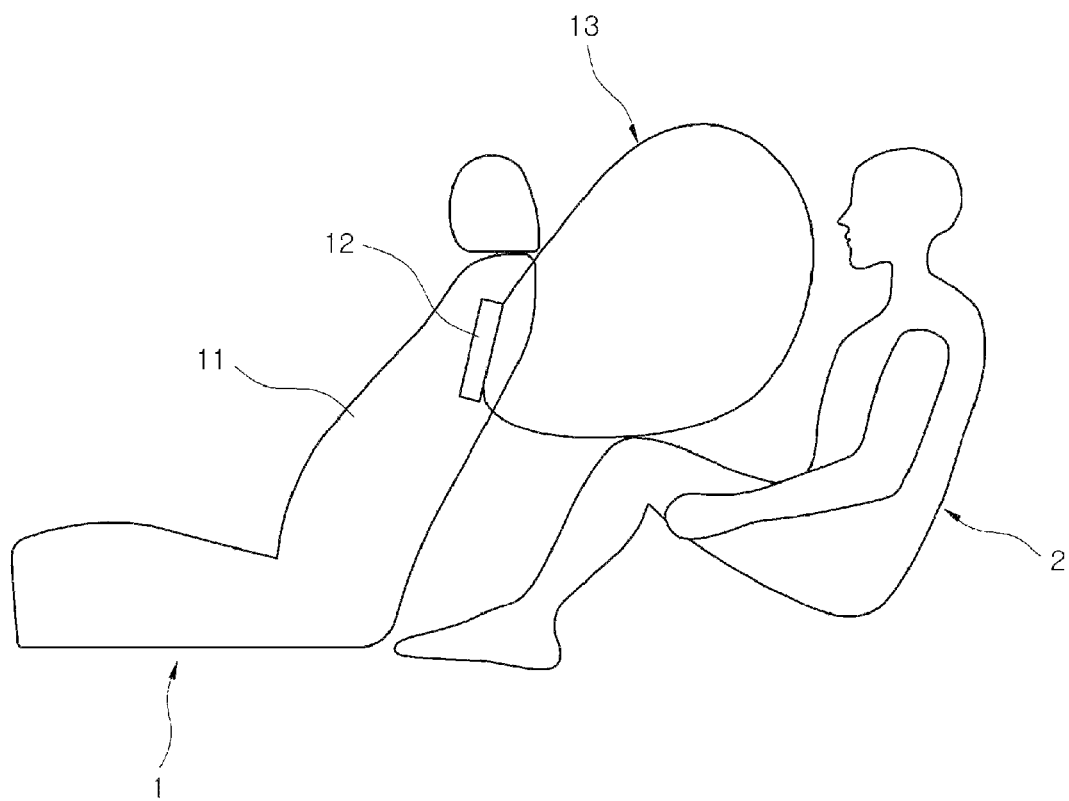
FIG. 5 is a schematic view illustrating the configuration of a conventional internal airbag device equipped in a vehicle.

As shown in FIG. 3A-3B, the vertical airbag section 132 may have a plurality of division airbag sections 133 spaced apart at regular intervals and extending a distance directly downwards from a body of a horizontal chamber 128 received in the airbag housing wherein the plurality of division airbag sections 133 forms the vertical airbag section 132.

The plurality of division airbag sections 133 may be provided with a tether 133c of a certain length connecting a horizontal chamber 128 of the horizontal airbag section 131 and lower ends of the vertical airbag section 132 with each other in order to allow the division airbag sections 133 to be bent into upper-side airbag sections 133a and lower-side airbag sections 133b when being inflated fully.

In the meantime, an airbag 130 of the invention deploys downwards using gas supplied from the inflator 110 thereby to protect a rear seat occupant. In particular, as shown in FIGS. 4A-4D, the airbag 130 includes a first airbag section 136 having a pair of left, right first elbow-type airbag sections 136a to be disposed in association with a driver's seat upon full inflation, and a second airbag section 137 having a pair of left, right second elbow-type airbag sections 137a to be disposed in association with a front passenger seat upon full inflation.

Thus, during a vehicle collision, the airbag 130 deploys towards the rear seat occupant between the front-side interior and the rear-side interior from the roof in such a manner that the rear seat occupants, who face the driver's seat and the front passenger seat, respectively, naturally come between the first and second elbow-type airbag sections 136a and 137a, which constitute the first and second airbag sections 136 and 137, respectively, thereby protecting the rear seat occupants from both frontal and side impacts.

Further, the first and second elbow-type airbag sections 136a and 137a may preferably be provided with vertical plates 138, respectively, for connecting the airbag section while maintaining the shape and strength of an airbag section body bent into an elbow and for protecting the occupants from broken pieces of glass from a lateral side of a vehicle upon collision. Here, the vertical plate 138 may also be provided in the first and second elbow-type airbag sections 136a and 137a that are provided in the outermost side adjacent to a door of a vehicle.

Further, the first and second elbow-type airbag sections 136a and 137a may be provided with a horizontal plate 139 for integrally connecting neighboring airbag section bodies with each other. Here, the horizontal plate 139 may be configured in a fashion of not connecting the first and second airbag sections 136 and 137 with each other, by connecting the adjacent left, right first elbow-type airbag sections 136a in a pair with each other to form the first airbag section 136 into a single piece, along with connecting the adjacent left, right second elbow-type airbag sections 137a in a pair with each other to form the second airbag section 137 into a single piece.

For convenience in explanation and accurate definition in the appended claims, the terms "upper", "lower", "inner" and "outer" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. An internal airbag device comprising:
   an inflator;
   an airbag housing mounted in a roof in a region between a front seat and a rear seat; and
   an airbag received in the airbag housing to deploy downwards by gas supplied from the inflator,
   wherein the airbag includes:
      a horizontal airbag section supported by the roof when the gas is supplied therein in a deployment thereof; and
      a vertical airbag section, an upper portion of which vertically extends from a rear end of the horizontal airbag section opposite the rear seat in a deployment thereof and receives gas from the rear end of the horizontal airbag section;
   wherein the rear end of the horizontal airbag section is aligned toward the rear seat; and
   wherein a rear outer portion of the vertical airbag section is connected to the roof by at least a tether in order to reinforce the strength of the deploying airbag.

2. The internal airbag device according to claim 1, wherein the vertical airbag section is a substantially planar airbag member involving spacing between a driver's seat and a front passenger seat.

3. The internal airbag device according to claim 1, wherein at least a vent hole is provided at a boundary region formed between the horizontal airbag section and the vertical airbag section.

4. The internal airbag device according to claim 1, wherein a lower end portion of the vertical airbag section is bent in a predetermined direction.

5. The internal airbag device according to claim 1, wherein the inflator is a dual-stage inflator.

\* \* \* \* \*